(12) United States Patent
Lien et al.

(10) Patent No.: US 7,724,124 B2
(45) Date of Patent: May 25, 2010

(54) CERAMIC MATERIAL USED FOR PROTECTION AGAINST ELECTRICAL OVERSTRESS AND LOW-CAPACITANCE MULTILAYER CHIP VARISTOR USING THE SAME

(75) Inventors: Ching-Hohn Lien, Taipei (TW); Cheng-Tsung Kuo, Banqiao (TW); Jun-Nun Lin, Zhubei (TW); Jie-An Zhu, Shanghai (CN); Li-Yun Zhang, Shanghai (CN); Xing-Guang Huang, Guishan Shiang (TW); Wei-Cheng Lien, Taipei (TW)

(73) Assignee: SFI Electronics Technology Inc., Guishan Shiang (TW)

( * ) Notice: Subject to any disclaimer, the term of this patent is extended or adjusted under 35 U.S.C. 154(b) by 755 days.

(21) Appl. No.: 11/704,987

(22) Filed: Feb. 12, 2007

(65) Prior Publication Data

US 2008/0191834 A1    Aug. 14, 2008

(51) Int. Cl.
*H01C 7/10*    (2006.01)
(52) U.S. Cl. .......... 338/21; 338/204; 338/312; 361/111; 257/536
(58) Field of Classification Search ............ 338/20, 338/21, 223, 333, 204, 312, 314; 361/111, 361/137; 257/536–538, 610.1
See application file for complete search history.

(56) References Cited

U.S. PATENT DOCUMENTS

| | | | | |
|---|---|---|---|---|
| 5,565,838 | A * | 10/1996 | Chan | 338/21 |
| 6,452,476 | B1 * | 9/2002 | Handa | 338/22 R |
| 2002/0093007 | A1 * | 7/2002 | Handa et al. | 252/500 |
| 2005/0200446 | A1 * | 9/2005 | Shirai et al. | 338/22 R |

* cited by examiner

*Primary Examiner*—Kyung Lee
(74) *Attorney, Agent, or Firm*—Bacon & Thomas, PLLC

(57) ABSTRACT

A low-capacitance multilayer chip varistor has capacitance lower than 0.5 pF at 1 MHz and has a characteristic of resisting more than thousands of times of 8 KV electrostatic shock, which comprises a ceramic main body, outer electrodes disposed at two ends of the ceramic main body and inner electrodes disposed therein; the ceramic main body comprises inorganic glass of 3~50 wt % and semi-conductive or conductive particles of 50~97 wt % with particle size of more than 0.1 μm, and a layer of inorganic glass film covers the surface of semi-conductive or conductive particles, wherein the inorganic glass film contains semi-conductive or conductive particles of submicron or nanometer which is smaller than 1 micron, and the quantity contained of semi-conductive or conductive particles is less than 20 wt % of that of inorganic glass.

12 Claims, 1 Drawing Sheet

CERAMIC MATERIAL USED FOR PROTECTION AGAINST ELECTRICAL OVERSTRESS AND LOW-CAPACITANCE MULTILAYER CHIP VARISTOR USING THE SAME

BACKGROUND OF THE INVENTION

1. Field of the Invention

The invention relates to a low-capacitance multilayer chip varistor, and more particularly, to a low-capacitance multilayer chip varistor having capacitance lower than 0.5 pF at 1 MHz for suppressing electrical overstress and electrostatic shock and protecting electronic circuits.

2. Description of the Related Art

The trend in electronic industry is towards higher working frequencies and smaller sizes. Therefore, the need of using varistors for protecting IC from damage due to electrical overstress is getting greater for high frequency application.

Conventional varistor is mainly composed of ZnO or $SrTiO_3$, and completed by sintering after oxides are added. Take ZnO varistor as an example, it is composed of ZnO and oxides of Bi, Sb, Si, Co, Mn, Cr and so on. At the high temperature more than 1000° C., $Bi_2O_3$ and oxides of Co, Mn, Cr and so on form a grain boundary among ZnO particles which has a microstructure like a grain boundary barrier capacitor. Thus, varistor composed of such materials has higher capacitance ranging from tens of pF to thousands of pF. Even the above materials are used in multilayer chip varistor, the varistor capacitance ranges from about 3 pF to hundreds of pF at 1 MHz. In circuits for high frequencies, when capacitance of the component for providing protection exceeds 3 pF, signals will distort. Therefore, the above component for providing protection is not suitable for high frequencies circuits.

Similarly, varistor component composed of $SrTiO_3$ has capacitance more than thousands of pF and is not suitable for circuits for high frequencies. In addition, when the transmission frequency is higher, the capacitance should be lower to prevent the signals from distortion.

U.S. Pat. No. 5,976,420 disclosed a chip type multilayer varistor having a low capacitance and high non-linearity coefficient, mainly composed of SiC containing at least two oxides selected from among $SiO_2$, $Bi_2O_3$, PbO, $B_2O_3$ and ZnO in an amount of from 0.1 to 20 mol %, and then combined with toluene and a binder agent and mixed by using a ball mill to obtain slurries, and thereafter become ceramic green sheets by using a doctor blade process. A paste was printed on the surface of the green sheets to form an inner electrode thereon. A predetermined number of ceramic green sheets were stacked to form a layered body. The resultant layered body was bonded by pressing at a constant pressure. The resultant green compact was cut into small-sized chips. The green chip was baked at a temperature in the range from 700 to 1100° C. to complete a ceramic multilayer chip type varistor resisting electrostatic shock and having surge voltage suppressing capability and a high non-linear coefficient from 10 to 20. The chip has a capacitance in the range from 10 to 40 pF, though not quite high, being much greater than 3 pF, and thus not suitable for using in high frequency circuits.

U.S. Pat. No. 6,251,513 disclosed a component for providing protection. Materials of the component comprise conductive and semi-conductive particles having a particle size of less than 10 μm and they are mixed with a polymer insulating binder to become a paste-like material. Left and right conductive electrodes are printed on a same surface of an insulating substrate and the paste-like material is filled in the gap between two conductive electrodes and then baked. Although the capacitance thereof is low and smaller than 0.25 pF at 1 MHz, the component is suitable for providing protection for high frequencies circuits. The insulating material is composed of polymer material, it is meant that heat generated by electrostatic shock or surge electrical overstress will carbonize the polymer material, make the component to be conductive and lose protection effect for electronic circuits or components. Thus, this component will not have good electrostatic shock withstanding capability and the lifetime thereof is short. Failure will occur only after 500 times of electrostatic shock when static electricity of direct contact 8 KV is applied.

SUMMARY OF THE INVENTION

One objective of the present invention is to provide a low-capacitance multilayer chip varistor with capacitance smaller than 0.5 pF at 1 MHz. The varistor has surge withstanding capability and a protection effect against static electricity, and more particularly, has a characteristic of resisting more than thousands of times of 8 KV electrostatic shock, and maintains original function after thousands times of electrostatic shock.

Another objective of the present invention is to provide a protective material against electrical overstress with tiny holes, and the material is used between the positive and negative electrodes for suppressing surge voltage and electrostatic shock. The material comprises inorganic glass of 3~50 wt % and semi-conductive or conductive particles of 50~97 wt % with particle size of more than 0.1 μm. In the previous compositions, a layer of inorganic glass film covers the surface of semi-conductive or conductive particles. The inorganic glass film comprises of semi-conductive or conductive of submicron or nanometer particles, which size is smaller than 1 micron. The quantity contained of semi-conductive or conductive particles is less than 20 wt % of that of inorganic glass.

Still another objective of the present invention is to provide a low-capacitance multilayer chip varistor with capacitance smaller than 0.5 pF at 1 MHz. The varistor comprises a ceramic main body, a pair of outer electrodes disposed at two ends of ceramic main body and several inner electrodes disposed therein. The ceramic body is made of a protective material against electrical overstress with tiny holes. The material comprises inorganic glass of 3~50 wt % and semi-conductive or conductive particles of 50~97 wt % with particle size of more than 0.1 μm. In the previous compositions, a layer of inorganic glass film covers the surface of semi-conductive or conductive particles. The inorganic glass film comprises of semi-conductive or conductive materials of submicron or nanometer particles, which size is smaller than 1 micron. The quantity contained of semi-conductive or conductive particles is less than 20 wt % of that of inorganic glass.

Still another objective of the present invention is to provide a low-capacitance and low-breakdown-voltage multilayer chip varistor. The trigger voltage of the varistor can be controlled by thickness of ceramic green sheets, sintering temperature of ceramic compact, glass layer thickness of grain boundary, size of conductive or semi-conductive particles and the quantity added of conductive or semi-conductive particles of nanometer sizes for secondary dispersion.

DETAILED DESCRIPTION OF THE PREFERRED EMBODIMENT

Figure 1:
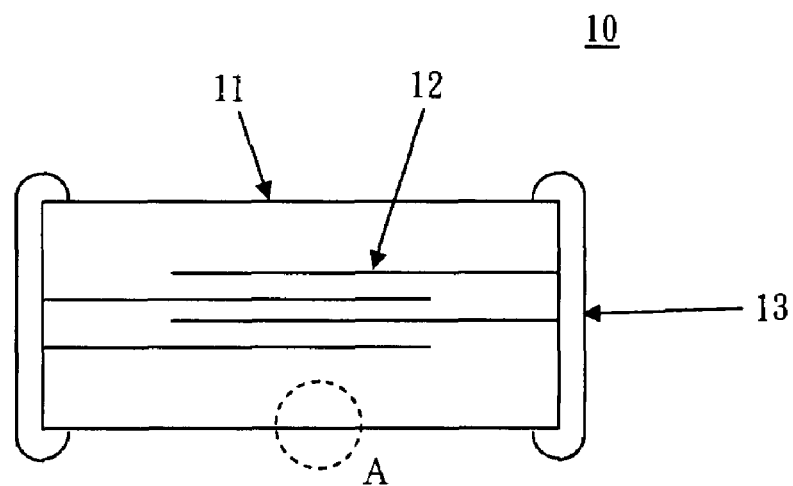
FIG. 1 is a schematic figure of the low-capacitance multilayer chip varistor in one preferred embodiment of the present invention.

As shown in FIG. 1, a low-capacitance multilayer chip varistor 10 in one preferred embodiment of the present invention is made by multilayer technology process. The varistor 10 is made by multilayer ceramic processes comprising high-temperature sintering and so on, and comprises a ceramic main body 11, outer electrodes 13 disposed at two ends of the ceramic main body 11 and inner electrodes 12 disposed therein.

Figure 2:
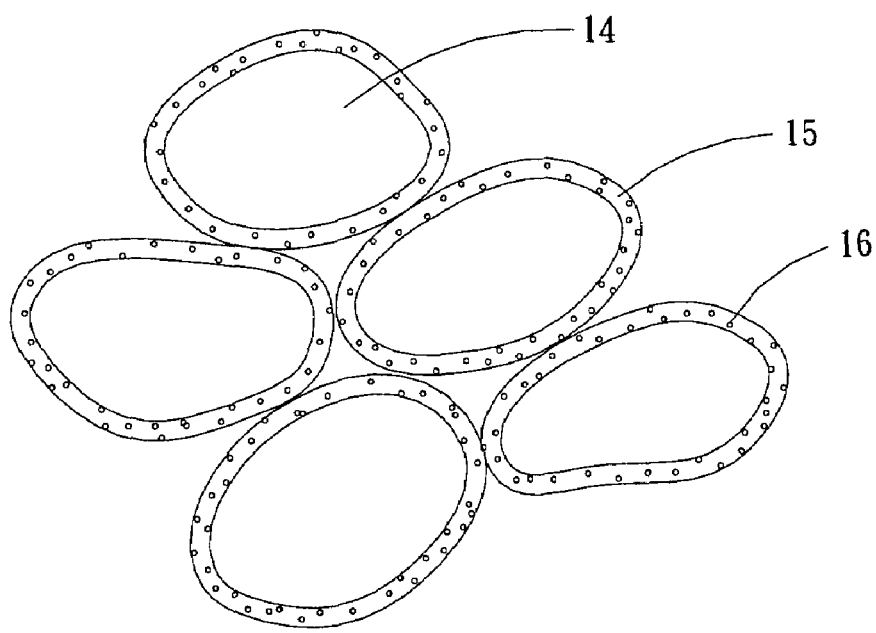
FIG. 2 is a schematic microstructure of the ceramic body of the low-capacitance multilayer chip varistor in the A area of the FIG. 1.

The ceramic main body 11 is made by a protective material against electrical overstress with tiny holes, and the microstructure thereof is shown in FIG. 2, which has high proportion of holes. The material of this specimen comprises inorganic glass of 3~50 wt % and semi-conductive or conductive particles 14 of 50~97 wt % with particle size of more than 0.1 μm. A layer of inorganic glass film 15 that resists high temperature covers the surface of semi-conductive or conductive particles 14.

The inorganic glass film 15 further comprises of the submicron or nanometer of semi-conductive or conductive particles 16, which is smaller than 1 micron for secondary dispersion. The quantity contained of semi-conductive or conductive particles is less than 20 wt % of that of inorganic glass.

According to the low-capacitance multilayer chip varistor 10 in the preferred embodiment of the present invention, the microstructure of the ceramic body 11 has high proportion of holes and low capacitance, which is less than 0.5 pF at 1 MHz.

In addition, according to the low-capacitance multilayer chip varistor 10 in the preferred embodiment of the present invention, the inorganic glass film 15 that resists high temperature exists among the semi-conductive or conductive particles 14 of the ceramic main body 11 for resisting heat generated when suppressing electrostatic shock or surge electrical overstress. Most of all, the inorganic glass film 15 comprises semi-conductive or conductive particles 16 of 0.1 micron or nanometer for secondary dispersion, and the gap among the particles 16 is quite small, so that when abnormal electrical overstress occurs the tunnel effect will occur. Consequently, the low-capacitance multilayer chip varistor 10 disclosed in the present invention suppresses electrical overstress, resists electrostatic shock and has a long lifetime.

The process of making the low-capacitance multilayer chip varistor 10 according to one preferred embodiment of the invention comprises steps of:

(1) Using a solution composed of glass component and made by sol-gel process, wherein the glass component comprises silicate glass, aluminosilicate glass, borate glass, phosphate glass, plumbate glass and so on, to disperse the nano-metal particles or semi-conductive particles uniformly into the solution composed of the glass component. The nanoparticles have particle sizes smaller than 1000 nanometer, and comprise metal conductive particles comprising Pt, Pd, Au, Ag, Ni, Cu and so on, or semi-conductive particles comprising SiC, ZnO, $TiO_2$, $SnO_2$, $SrTiO_3$, $BaTiO_3$ and so on.

(2) Mixing semi-conductive or conductive particles uniformly into the above-mentioned solution with metal or semi-conductive nanoparticles dispersed therein, and milling them into composite material after drying and calcining at proper temperature (lower than 1000° C.). Semi-conductive or conductive particle sizes are of submicron or micron that is larger than 0.1 μm. The conductive particles comprise Pt, Pd, Au, Ag, Ni, Cu and so on; while the semi-conductive particles comprise SiC, ZnO, $TiO_2$, $SnO_2$, $SrTiO_3$, $BaTiO_3$ and so on, or particles of above-mentioned semi-conductive particles.

(3) Using conventional multilayer technique to obtain slurries by adding a binder agent into the above-mentioned composite material, a doctor blade process used for becoming ceramic green sheets of thickness of 10~50 μm. Then, use multilayer chip process to print two or more than two layers of staggered inner electrodes. The inner electrodes comprise metals comprising Pt, Pd, Au, Ag, Ni and so on. After laminating with the upper and lower cover layer and cutting, sintering is done at 700~1200° C. Two ends of the component are attached with silver plaste to be sintered to become external electrodes. Then, low-capacitance multilayer chip varistor suppressing static electricity and surge is completed. Besides, materials of the external electrode comprise Ag, Cu, Ag—Pd alloy and so on.

The low-capacitance multilayer chip varistor in the preferred embodiment of the invention made by above processes has advantages of low capacitance, low breakdown voltage and so on, and suppresses thousands of times of 8 KV electrostatic shock, while the capacitance thereof is smaller than 0.5 pF and thus can be used to protect electronic circuits for high frequencies.

PREFERRED EMBODIMENTS

The following paragraphs will describe some preferred embodiments of the low-capacitance multilayer chip varistor according to the present invention, wherein the varistor has characteristics of 0.5 pF capacitance at 1 MHz, suppressing thousands of times of 8 KV electrostatic shock, suppressing electrical overstress, suppressing electrostatic shock and protecting electronic circuits for high frequencies.

In addition, following preferred embodiments will take multilayer chip varistor as an example. However, the process in the present invention can also be used to produce disc type varistor, or the material according to the present invention can be uses to be placed in between any two electrodes for suppressing transient surge voltage or electrostatic shock.

Example 1

SiC powder of particle size ranging from 0.1~20 μm and nano-metal Pt of particle size ranging from 0.01~2 μm are added into the gel-like solution composed of nano-silicate glass, which made by sol-gel process, and well stirred the previous mixed solution. Thus, the SiC powder uniformly surrounded a layer of organic film containing glass component. Eight samples with different solutions are obtained according to the weight proportion of the SiC powder, nano-Pt and glass as shown in following Table 1.

TABLE 1

| Sample | SiC wt % | Pt particle wt % | Glass wt % |
|---|---|---|---|
| 1 | 100 | 0 | 10 |
| 2 | 100 | 1 | 10 |
| 3 | 100 | 0 | 15 |
| 4 | 100 | 1 | 15 |
| 5 | 100 | 0 | 20 |
| 6 | 100 | 1 | 20 |
| 7 | 100 | 0 | 40 |
| 8 | 100 | 1 | 40 |

The mixed solutions as shown in Table 1 are dried to become powders and disposed in a calcining oven for being calcined at 700° C. to become SiC powders coated with glass film.

The calcined powder is milled roughly and then finely, and a solution (such as toluene or butanol), a binder agent (such as polyvinyl butyral) and a dispersing agent are put together into a ball mill to be milled to obtain slurries. Then, it becomes ceramic green sheets of 30 μm thickness by using a doctor blade process.

As shown in Table 1, eight sheets of these kinds are stacked and pressed to become lower covers with about 200 μm thickness. After printing inner electrode on the lower covers and drying, a thin sheet with 30 μm thickness is disposed and then inner electrode is printed again. This inner electrode and the inner electrode on the lower layer are connected to the right and left ends of the component in a stagger manner. Materials of the inner electrode comprise Pt, Ag, Pd or alloy of any two of these metals.

Eight sheets of these kinds are stacked and pressed to become upper covers with about 200 μm thickness. Upper covers and above-mentioned lower covers with inner electrodes are stacked together and pressed, and then be cut into ceramic sheet chips of size of 1.2 mm*0.6 mm*0.6 mm. The ceramic sheet chips are disposed in a sintering oven for sintering, and the sintering temperature is about 800~1000° C. After sintering, the size of the chips is 1.0 mm*0.5 mm*0.5 mm. Two ends of the chips are soaked in outer electrodes which are heated to be attached thereon at 600~900° C., and then a low-low-capacitance, low-voltage and surge or static electricity suppressing multilayer chip varistor is completed.

The breakdown voltages of multilayer chip varistor and the breakdown voltages after 8 KV electrostatic tests are shown in Table 2.

TABLE 2

| Sample | Breakdown Voltage (V1 mA) | Capacitance (pF at 1 MHz) | Trigger Voltage (V) | Breakdown Voltage Variation After 1000 Times of Electrostatic Shock (%) |
|---|---|---|---|---|
| 1 | 67 | 0.25 | 120 | −23.0 |
| 2 | 54 | 0.28 | 110 | −15.1 |
| 3 | 110 | 0.14 | 205 | −9.0 |
| 4 | 75 | 0.12 | 154 | −7.2 |
| 5 | 234 | 0.09 | 422 | −7.5 |
| 6 | 137 | 0.08 | 257 | −6.0 |
| 7 | 415 | 0.08 | 1032 | −11.4 |
| 8 | 343 | 0.07 | 730 | −8.6 |

As shown in Table 2, the more glass is contained, the high breakdown voltage and the less capacitance. This phenomenon is related to the high resistance of the glass. When the glass contained is more, the grain boundary insulating layer is thicker, and thus the multilayer chip varistor has higher breakdown voltage and smaller capacitance.

In addition, when the weight proportion of SiC to glass is from 100:15 to 100:20, the multilayer chip varistor has preferred electro-static discharge (ESD) suppressing capability. When the glass contained is less, the insulating resistance will be not enough, and the variation of breakdown voltage at 1 mA will be larger than 10% for the multilayer chip varistor after ESD. Thus, the electrical characteristics are better when the glass contained is more than 15 wt %. However, when the glass contained is more than 20 wt %, because the grain boundary is thicker, the breakdown voltage and trigger voltage will be too high (the trigger voltage is more than 800V) and not suitable as protective component. Therefore, the quantity of glass addition is preferred to be controlled between 15 wt % to 20 wt %.

As shown in Table 2, no matter what proportion of SiC to glass added is, the nano-metal particles added have effects of lowering trigger voltages and improving variation of breakdown voltage after electrostatic shock; however, the capacitance is relatively higher.

As shown in Table 2, when the glass contained is from 10 wt % to 40 wt %, the capacitance of each multilayer chip varistor is small and less than 0.5 pF.

Example 2

Oxides such as ZnO powder, $Bi_2O_3$, CoO and so on of particle size ranging from 0.120 μm and nano-metal Pd of particle size ranging from 0.01~2 μm are added into the gel-like solution composed of nano-silicate glass, which made by sol-gel process, well stirred the previous mixed solution. Thus, the SiC powder uniformly surrounded a layer of organic film containing glass component. The weight proportion of the ZnO, $Bi_2O_3$, CoO, nano-metal Pd particles and nano-glass is shown in Table 3.

TABLE 3

|  | ZnO | $Bi_2O_3$ | CoO | Pd | Glass |
|---|---|---|---|---|---|
| wt % | 100 | 5 | 2 | 1 | 20 |

Then, in the same manner as the Example 1, the above-mentioned powder is processed to become multilayer chip varistor. The breakdown voltages of component, the breakdown voltage variation after 8 KV electrostatic shocks and the capacitance are shown in Table 4.

TABLE 4

| Sheet Thickness (μm) | Breakdown Voltage (V1 mA) | Capacitance (pF at 1 MHz) | Trigger Voltage (V) | Breakdown Voltage Variation After 1000 Times of Electrostatic Shock (%) |
|---|---|---|---|---|
| 30 | 206 | 0.27 | 420 | 10 |

Table 4 shows that when oxides such as ZnO and so on are taken as semi-conductive particles and the process of the present invention is used, the low-capacitance and static electricity suppressing multilayer chip varistor can be made.

Table 4 also shows that the multilayer chip varistor using ZnO as material has higher trigger voltage. For lowering the trigger voltage, the thickness of sheets among electrodes is changed from 30 μm to 15 μm, and then the result is shown in Table 5.

TABLE 5

| Sheet Thickness (μm) | Breakdown Voltage (V1 mA) | Capacitance (pF at 1 MHz) | Trigger Voltage (V) | Breakdown Voltage Variation After 1000 Times of Electrostatic Shock (%) |
|---|---|---|---|---|
| 15 | 143 | 0.43 | 257 | 15 |

Comparing the results in Table 4 and Table 5, when the thinner sheets are used, the trigger voltage is lower and the capacitance is higher. This result is similar to general multilayer ZnO varistors. Thus, in a predetermined range, the thickness of sheets can be adjusted to control the trigger voltage.

Example 3

SiC powder of particle size ranging from 2~7 μm and nano-metal Pt of particle size ranging from 0.03~0.5 μm are added into the gel-like solution composed of nano-silicate glass, which made by sol-gel process, well stirred the previous mixed solution. Thus, the SiC powder uniformly surrounded a layer of organic film containing glass component. Then, in the same manner of the first preferred embodiment, a multilayer chip varistor is completed. The electrical characteristics of the multilayer chip varistor are measured and shown in Table 6.

TABLE 6

| | Particle Size for Secondary Dispersion (μm) | Breakdown Voltage (V1 mA) | Capacitance (pF at 1 MHz) | Trigger Voltage (V) |
|---|---|---|---|---|
| SiC (30 μm sheet) | 0.5 | 58 | 0.26 | 124 |
| | 0.03 | 45 | 0.29 | 68 |

As shown in Table 6, when the particle size for secondary dispersion is smaller, the multilayer chip varistor has lower breakdown voltage; however, the capacitance is relatively higher.

Example 4

The multilayer chip varistor sheets made in the Example 1 are sintered at 850~1000° C., and the effects of different sintering conditions are shown in Table 7. It shows that when the sintering temperature is higher, the breakdown voltage is lower; however the capacitance is increased and the leakage current is decreased. Similarly, when the sintering time is increased, the breakdown voltage is lower.

TABLE 7

| Sintering Temperature (° C.) | Sintering Time (hr) | Breakdown Voltage (V1 mA) | Capacitance (pF at 1 MHz) | Leakage Current (μA at 24 V) |
|---|---|---|---|---|
| 850 | 2 | 265 | 0.10 | 0.67 |
| 850 | 5 | 228 | 0.11 | 0.53 |
| 950 | 2 | 185 | 0.13 | 0.50 |

Example 5

When changing the overlapping area of inner electrodes of the multilayer chip varistor sheets made according to the same manner in the first preferred embodiment, a varistor of 0.02 pF is completed as shown in Table 8. Accordingly, the size of the overlapping area of inner electrodes can be used to adjust the capacitance substantially.

TABLE 8

| | Overlapping Area of Inner Electrodes (mm²) | | |
|---|---|---|---|
| | 0.12 | 0.06 | 0.03 |
| Capacitance (pF at 1 MHz) | 0.12 | 0.07 | 0.03 |

As shown in the above-mentioned embodiments, after adjusting various parameters, the multilayer chip varistor according to the present invention has quite low capacitance, and is particularly suitable to be applied in the protection for high frequency circuits against electrical overstress such as static electricity or transient surge.

What is claimed is:

1. A material with tiny holes for protecting against electrical overstress, the material being applied among positive and negative electrodes for suppressing transient surge voltage and electrostatic shock, the material comprising inorganic glass of 3~50 wt % and semi-conductive or conductive particles of 50~97 wt % with particle size larger than 0.1 micron, a layer of inorganic glass film covering surfaces of the semi-conductive or conductive particles.

2. The material with tiny holes for protecting against electrical overstress as described in claim 1, wherein the inorganic glass film contains semi-conductive or conductive particles of submicron or nanometer smaller than 1 micron, and quantity contained of the semi-conductive or conductive particles is less than 20 wt % of quantity contained of the inorganic glass.

3. The material with tiny holes for protecting against electrical overstress as described in claim 1, wherein the inorganic glass comprises one or more of silicate glass, aluminosilicate glass, borate glass, phosphate glass, plumbate glass and other inorganic acid-ate glass.

4. The material with tiny holes for protecting against electrical overstress as described in claim 2, wherein the inorganic glass comprises one or more of silicate glass, aluminosilicate glass, borate glass, phosphate glass, plumbate glass and other inorganic acid-ate glass.

5. The material with tiny holes for protecting against electrical overstress as described in claim 2, wherein the semi-conductive particle is selected from one of ZnO, $TiO_2$, $SnO_2$, Si, Ge, SiC, Si—Ge alloy, InSb, GaAs, InP, GaP, ZnS, ZnSe, ZnTe, $SrTiO_3$ and $BaTiO_3$.

6. The material with tiny holes for protecting against electrical overstress as described in claim 2, wherein the conductive particle is selected from one or more of Pt, Pd, W, Au, Al, Ag, Ni, Cu and alloy thereof.

7. A low-capacitance multilayer chip varistor having capacitance lower than 0.5 pF at 1 MHz, the varistor comprising a ceramic main body, outer electrodes being disposed at two ends of the ceramic main body and inner electrodes being disposed therein, the ceramic main body comprising inorganic glass of 3~50 wt % and semi-conductive or conductive particles of 50~97 wt % with particle size of more than 0.1 μm, a layer of inorganic glass film coating surfaces of the semi-conductive or the conductive particles.

8. The low-capacitance multilayer chip varistor as described in claim 7, wherein the inorganic glass film contains semi-conductive or conductive particles of submicron or nanometer smaller than 1 micron, and quantity contained of the semi-conductive or conductive particles is less than 20 wt % of quantity contained of the inorganic glass.

9. The low-capacitance multilayer chip varistor as described in claim 7, wherein the inorganic glass comprises one or more of silicate glass, aluminosilicate glass, borate glass, phosphate glass, plumbate glass and other inorganic acid-ate glass.

10. The low-capacitance multilayer chip varistor as described in claim 8, wherein the inorganic glass comprises one or more of silicate glass, aluminosilicate glass, borate glass, phosphate glass, plumbate glass and other inorganic acid-ate glass.

11. The low-capacitance multilayer chip varistor as described in claim 8, wherein the semi-conductive particle is selected from one of ZnO, $TiO_2$, $SnO_2$, Si, Ge, SiC, Si—Ge alloy, InSb, GaAs, InP, GaP, ZnS, ZnSe, ZnTe, $SrTiO_3$ and $BaTiO_3$.

12. The low-capacitance multilayer chip varistor as described in claim 8, wherein the conductive particle is selected from one or more of Pt, Pd, W, Au, Al, Ag, Ni, Cu and alloy thereof.

* * * * *